United States Patent
Davidson

(10) Patent No.: US 11,177,099 B2
(45) Date of Patent: Nov. 16, 2021

(54) SWITCHING APPARATUS

(71) Applicant: GENERAL ELECTRIC TECHNOLOGY GMBH, Baden (CH)

(72) Inventor: Colin Charnock Davidson, Stafford (GB)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 16/963,703

(22) PCT Filed: Jan. 31, 2019

(86) PCT No.: PCT/EP2019/052366
§ 371 (c)(1),
(2) Date: Jul. 21, 2020

(87) PCT Pub. No.: WO2019/149814
PCT Pub. Date: Aug. 8, 2019

(65) Prior Publication Data
US 2021/0082643 A1 Mar. 18, 2021

(30) Foreign Application Priority Data
Jan. 31, 2018 (EP) .................................. 181544479

(51) Int. Cl.
*H01H 33/59* (2006.01)
*H01H 9/54* (2006.01)
*H02H 3/087* (2006.01)

(52) U.S. Cl.
CPC .......... *H01H 33/596* (2013.01); *H01H 9/542* (2013.01); *H01H 9/548* (2013.01); *H02H 3/087* (2013.01); *H01H 2009/543* (2013.01)

(58) Field of Classification Search
CPC .......... H01H 2009/543; H01H 33/596; H01H 47/22; H01H 47/28; H01H 47/30;
(Continued)

(56) References Cited

U.S. PATENT DOCUMENTS 2,619,524 A * 11/1952 Van Dorsten ............ H01H 9/54
361/8
2,849,659 A * 8/1958 Kesselring ........... H01H 33/596
361/4
(Continued)

FOREIGN PATENT DOCUMENTS

EP 1684318 A1 7/2006
EP 2701255 A1 2/2014
(Continued)

OTHER PUBLICATIONS

International Search Report of PCT/EP2019/052366 dated Feb. 27, 2019.
(Continued)

*Primary Examiner* — Jared Fureman
*Assistant Examiner* — Nicolas Bellido
(74) *Attorney, Agent, or Firm* — Eversheds Sutherland (US) LLP

(57) ABSTRACT

A switching apparatus comprises: a first current-conductive branch (12) including a first switching element (24), the first switching element (24) configured to be switchable to selectively permit and block a flow of current in the first current-conductive branch (12); a second current-conductive branch (14) including a second switching element (32), the second switching element (32) configured to be switchable to selectively permit and block a flow of current in the second current-conductive branch (14); and first and second terminals (18,20) for connection, in use, to an electrical network (22), wherein the first and second current-conductive branches (12,14) extend between the first and second terminals (18,20), wherein the first current-conductive branch (12) further includes an energy storage element electrically coupled to the second switching element (32) so that the energy storage element is configured as a power source for enabling the operation of the second switching element (32),
(Continued)

and the first switching element (24) is configured to be switchable to selectively direct a current flowing in the first current-conductive branch (12) to flow through the energy storage element so as to store energy in the energy storage element.

16 Claims, 6 Drawing Sheets

(58) Field of Classification Search
CPC .......... H01H 47/32; H01H 9/54; H01H 9/542; H01H 9/548; H02H 3/087; H03B 7/10; H03K 3/55
See application file for complete search history.

(56) References Cited

U.S. PATENT DOCUMENTS

2017/0288388 A1* 10/2017 Horinouchi ............ H01H 77/02
2020/0373921 A1* 11/2020 Davidson ............. H01H 33/596

FOREIGN PATENT DOCUMENTS

WO      2014/142974 A1    9/2014
WO   WO-2014142974 A1 *  9/2014  ........... H01H 33/596

OTHER PUBLICATIONS

European Search Report for Application No. 18154447.9 dated Jun. 22, 2018.

* cited by examiner

SWITCHING APPARATUS

CROSS-REFERENCE TO RELATED APPLICATIONS

This application is a U.S. National Stage Application under 35 U.S.C. 371 and claims the priority benefit of International Application No. PCT/EP2019/052366 filed Jan. 31, 2019, which claims priority to EP18154447.9, filed Jan. 31, 2018, which are both incorporated herein by reference.

This invention relates to a switching apparatus, preferably a switching apparatus for use in a circuit interruption device.

It is known to use a switching apparatus with parallel-connected current-conductive branches, where the switching apparatus is capable of commutating current between the parallel-connected current-conductive branches.

According to an aspect of the invention, there is provided a switching apparatus comprising:
- a first current-conductive branch including a first switching element, the first switching element configured to be switchable to selectively permit and block a flow of current in the first current-conductive branch;
- a second current-conductive branch including a second switching element, the second switching element configured to be switchable to selectively permit and block a flow of current in the second current-conductive branch; and
- first and second terminals for connection, in use, to an electrical network, wherein the first and second current-conductive branches extend between the first and second terminals,
- wherein the first current-conductive branch further includes an energy storage element electrically coupled to the second switching element so that the energy storage element is configured as a power source for enabling the operation of the second switching element, and the first switching element is configured to be switchable to selectively direct a current flowing in the first current-conductive branch to flow through the energy storage element so as to store energy in the energy storage element.

The configuration of the first switching element, the energy storage element and the second switching element in the switching apparatus of the invention provides a power supply mechanism by which the energy for powering the second switching element can be derived from a current flowing in the first current-conductive branch, which for example may be during a normal or fault operation of the switching apparatus. This beneficially obviates the need for a stand-alone power source coupled to the second switching element, thus providing savings in terms of hardware cost, size and weight. In addition, the use of the energy storage element to store energy drawn from the current flowing in the first current-conductive branch provides a reliable means of deriving energy from the current flowing in the first current-conductive branch to provide a required amount of power to the second switching element even when the first and second terminals are at voltage levels which may be incompatible with the power requirements associated with the operation of the second switching element.

In addition, by way of the first switching element selectively directing a current flowing in the first current-conductive branch to flow through the energy storage element so as to store energy in the energy storage element, the switching of the first switching element can be used as a trigger for the operation of the second switching element. This may be usefully applied to a sequential operation of the first and second switching elements, in particular a sequential switching operation of the first and second switching elements such as the commutation of current from the first current-conductive branch to the second current-conductive branch.

The energy storage element may be any type of energy storage element, such as a capacitor, which is capable of storing and releasing energy to selectively provide a voltage.

The energy storage element may be configured as a power source for enabling a switching operation of the second switching element. For example, in embodiments of the invention, the operation of the second switching element may include at least one of:
- a turn-on of the second switching element;
- a turn-off of the second switching element.

In a preferred embodiment of the invention, the second switching element may include at least one gas tube switch. It will be understood that the second switching element may include a single gas tube switch or a plurality of gas tube switches (e.g. a plurality of series-connected gas tube switches).

A single gas tube switch is capable of providing a single high-voltage switch with a voltage rating of hundreds of kV. Hence, the use of the gas tube switch(es) in the second switching element allows for a cheaper and more compact configuration of the switching apparatus when compared to a switching apparatus based on a switching element having a plurality of semiconductor switches with an equivalent combined voltage rating. The configuration of the switching apparatus of the invention permits the supply of energy from the current in the first current-conductive branch to the second switching element, via the storage of energy in the energy storage element, in a manner compatible with the power requirements of the turn-on and turn-off operations of the gas tube switch(es).

The energy storage element may be configured as a power source for enabling one or more auxiliary operations of the second switching element. The first current-conductive branch can be configured to allow the energy storage element to supply power in a manner commensurate with the electrical requirements of the or each auxiliary operation of the second switching element.

In particular, the energy storage element may be configured as a power source compatible with the power requirements of one or more auxiliary operations of the second switching element including the or each gas tube switch. For example, in embodiments of the invention employing the use of at least one gas tube switch, the operation of the second switching element may include at least one of:
- operating at least one monitoring device (e.g. a current sensor, a voltage sensor, a gas pressure sensor, a temperature sensor) to monitor an operating state (e.g. current, voltage, internal gas pressure, temperature) of the or each gas tube switch, wherein the switching apparatus includes the or each monitoring device;
- operating an or a respective electrode to control an or a respective electric field in the or each gas tube switch so as to maintain a or a respective conductive plasma in the or each gas tube switch, wherein the or each gas tube switch includes the or the respective electrode;
- operating at least one gas pressure controller to control an internal gas pressure in the or each gas tube switch, wherein the switching apparatus includes the or each gas pressure controller.

Current in the first current-conductive branch may be directed to flow through the energy storage element so as to store energy in the energy storage element immediately before or when the operation of the second switching element is performed.

Optionally the switching apparatus of the invention may include a switching controller configured to selectively control the switching of the first switching element to periodically or intermittently direct a current flowing in the first current-conductive branch to flow through the energy storage element so as to maintain a non-zero level of energy stored in the energy storage element. This permits maintenance of a certain level of stored energy in the energy storage element in order to provide a continuous supply of power for enabling the operation of the second switching element, which for example may include the monitoring of the operating state of the or each gas tube switch, the maintenance of the conductive plasma in the or each gas tube switch or the control of the internal gas pressure in the or each gas tube switch.

The inventor has identified various ways of electrically coupling the energy storage element to the second switching element in order to configure the energy storage element as a power source for enabling the operation of the second switching element, non-limiting examples of which are described as follows.

In embodiments of the invention, the energy storage element may be electrically coupled to the second switching element to form a galvanically isolated electrical connection between the energy storage element and the second switching element, and the galvanically isolated electrical connection may be arranged to configure the energy storage element as a power source for enabling the operation of the second switching element.

The provision of a galvanically isolated electrical connection between the energy storage element and the second switching element allows for flexibility in the design of the switching apparatus to accommodate differences between the electrical potentials of the power source and the second switching element.

In such embodiments, the galvanically isolated electrical connection may include an isolating converter, preferably an isolating DC-DC converter. The inclusion of the isolating converter provides a reliable means of forming the galvanically isolated electrical connection between the energy storage element and the second switching element.

In embodiments of the invention, the energy storage element may be electrically coupled to the second switching element to form a direct electrical connection between the energy storage element and the second switching element, and the direct electrical connection may be arranged to configure the energy storage element as a power source to enable the operation of the second switching element. It will be understood that the direct electrical connection is intended to encompass electrical connections without galvanic isolation.

The provision of a direct electrical connection between the energy storage element and the second switching element allows for a simple and compact arrangement of the switching apparatus, for example when compared to a switching apparatus with the aforementioned galvanically isolated electrical connection.

In such embodiments, the direct electrical connection may include at least one third switching element. The inclusion of the or each third switching element in the direct electrical connection permits selective switching control over the configuration of the energy storage element as a power source for enabling the operation of the second switching element.

The energy storage element may be electrically coupled to the second switching element to form both the galvanically isolated electrical connection and the direct electrical connection between the energy storage element and the second switching element. This provides further flexibility in the design of the switching apparatus to accommodate different requirements. For example, in embodiments of the invention, the galvanically isolated electrical connection may be arranged to configure the energy storage element as a power source for enabling one of: a turn-on of the second switching element; and a turn-off of the second switching element, and the direct electrical connection may be arranged to configure the energy storage element as a power source for enabling the other of: a turn-on of the second switching element; and a turn-off of the second switching element.

In embodiments of the invention, the first current-conductive branch may include a non-linear resistive element configured to clamp a voltage across the energy storage element when a protective level of the non-linear resistive element is reached. This provides a controlled voltage across the energy storage element when it is used as a power source to enable the operation of the second switching element. The protective level of the non-linear resistive element may be configured in accordance with the required amount of clamped voltage across the energy storage element to meet the power requirements of the second switching element.

In a preferred embodiment of the invention, the energy storage element may be configured as a snubber component for the first switching element. This provides the switching apparatus of the invention with further cost, size and weight savings, since the energy storage element in such embodiments is used to provide both a power supply function and an electrical snubbing function.

In a further preferred embodiment of the invention, an emitter terminal of the first switching element and a cathode terminal of the second switching element may be connected to a common node. This allows the switching apparatus to be configured such that the energy storage element (source) and the second switching element (load) are at the same, or substantially the same, electrical potential which allows for a reduction in the voltage isolation requirements of the energy storage element.

Optionally each of the first and second switching elements may be configured as a unidirectional or bidirectional switching element. The invention is applicable to the configuration of the switching apparatus as a unidirectional or bidirectional switching apparatus.

According to a second aspect of the invention, there is provided an electrical assembly comprising at least one switching apparatus according to the first aspect of the invention or any one of its embodiments described hereinabove. Optionally the electrical assembly may include a plurality of switching apparatus connected in series.

In a preferred embodiment of the invention, the electrical assembly may be a circuit interruption device, optionally a DC circuit interruption device.

For the purposes of this specification, opening a circuit interruption device refers to the use of the circuit interruption device to open a closed circuit to interrupt current flow in the circuit, while closing a circuit interruption device refers to the use of the circuit interruption device to complete an open circuit to permit current flow in the circuit. A DC circuit interruption device may be any device that is capable of interrupting direct current flow in a DC circuit. Such a DC circuit interruption device may be, but is not limited to, a DC circuit breaker.

The circuit interruption device may further include an energy absorption device, e.g. a surge arrester, wherein switching operations of the first and second switching elements may be configured so that a current initially flowing in the first current-conductive branch is interrupted by first commutating the current from the first current-conductive branch to the second current-conductive branch and then commutating the current from the second current-conductive branch to the energy absorption device.

The configuration of the switching apparatus of the invention permits the supply of energy from the current in the first current-conductive branch to the second switching element, via the storage of energy in the energy storage element, even when the circuit interruption device is designed to operate at high voltage levels, e.g. hundreds of kV, which may be incompatible with the power requirements of the operation of the second switching element.

In a preferred embodiment of the invention, the switching apparatus may be configured for use in a HVDC application.

It will be appreciated that the use of the terms "first" and "second", and the like, in this patent specification is merely intended to help distinguish between similar features (e.g. the first and second current-conductive branches, the first and second switching elements), and is not intended to indicate the relative importance of one feature over another feature, unless otherwise specified.

Preferred embodiments of the invention will now be described, by way of non-limiting examples, with reference to the accompanying drawings in which.

The figures are not necessarily to scale, and certain features and certain views of the figures may be shown exaggerated in scale or in schematic form in the interests of clarity and conciseness.

The following embodiments of the invention are used primarily in HVDC applications, but it will be appreciated that the following embodiments of the invention are applicable mutatis mutandis to other switching applications.

Figure 1:
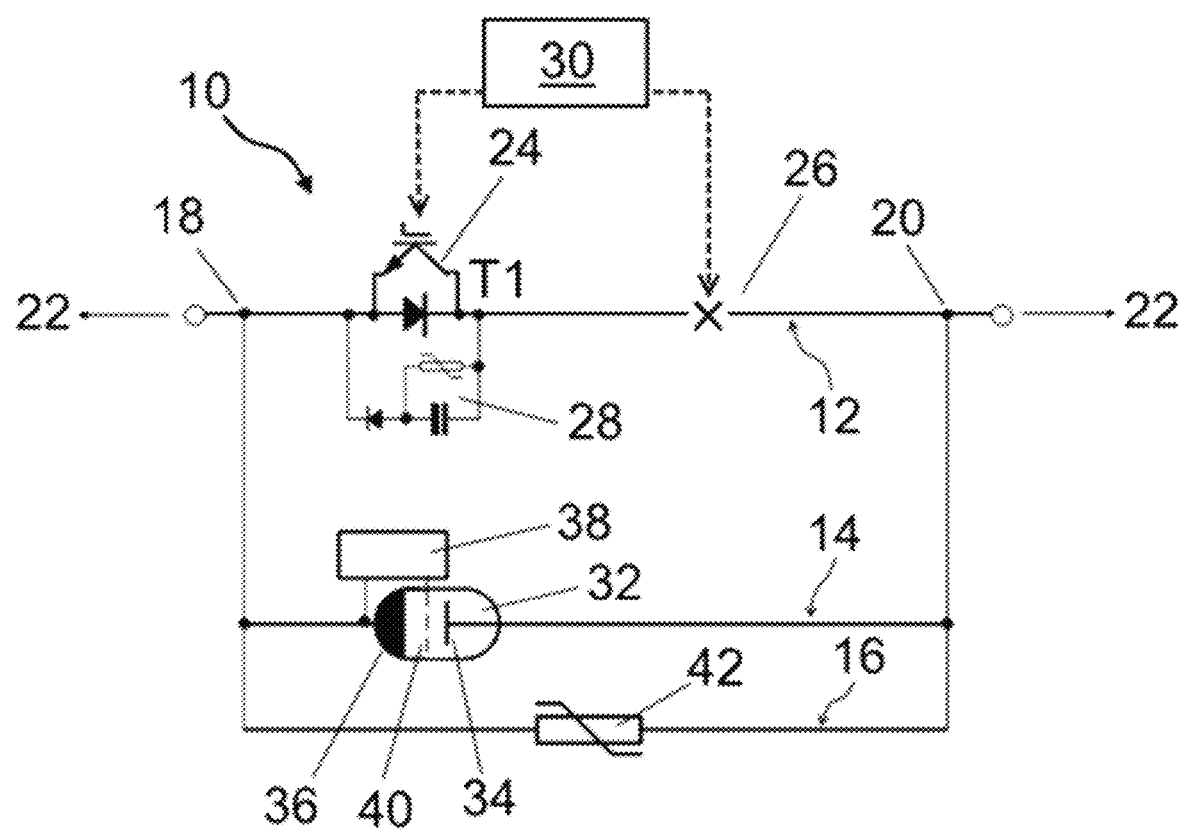
FIG. 1 shows schematically a DC circuit breaker according to a first embodiment of the invention.

A DC circuit breaker according to a first embodiment of the invention is shown in FIG. 1, and is designated generally by the reference numeral 10.

The DC circuit breaker 10 comprises a switching apparatus, which includes a first current-conductive branch 12, a second current-conductive branch 14 and an energy absorption branch 16. The first current-conductive branch 12, second current-conductive branch 14 and energy absorption branch 16 are connected in parallel between first and second DC terminals 18,20. In use, the first and second DC terminals 18,20 are connected to a DC electrical network 22 such that the DC circuit breaker 10 can be configured to carry a DC load current.

The first current-conductive branch 12 includes a first switching element 24 and a mechanical switching element 26. The first switching element 24 includes a low voltage switching device in the form of an insulated gate bipolar transistor (IGBT) T1, and further includes a snubber circuit 28 connected across the IGBT T1. The snubber circuit 28 in the embodiment shown is in the exemplary form of a diode-capacitor turn-off snubber with a metal-oxide surge arrester connected in parallel with the capacitor, and the snubber circuit 28 can be configured to limit the peak voltage and the rate of change of voltage across the IGBT T1 at turn-off. The mechanical switching element 26 includes an ultra-fast mechanical switch in the form of a vacuum switch, but may instead include another type of mechanical switch such as a gas insulated interrupter or more particularly an $SF_6$-insulated interrupter.

The switching apparatus further includes a first switching controller 30 which is configured to control the switching of the IGBT T1 and mechanical switching element 26 so that, in use, each of the first and mechanical switching elements 24,26 are switchable to selectively permit and block a flow of current in the first current-conductive branch 12.

The second current-conductive branch 14 includes a second switching element 32. The second switching element 32 includes a gas tube switch. The gas tube switch includes a chamber enclosing an ionizable gas, such as hydrogen, helium or other suitable gases, and is configured to generate a plasma of ionized gas in the gas tube switch. In use, a controlled flow of electrical current is conducted from an anode 34 to a cathode 36 through the gas in the chamber.

The gas tube switch further includes a "keep-alive" grid electrode (not shown) which is operable to maintain a weak conductive plasma within the chamber to facilitate the operation of the gas tube switch without, for example, the use of an ignitor.

The switching apparatus further includes a second switching controller 38 which is configured to control the switching of the gas tube switch so that, in use, the second switching element 32 is switchable to selectively permit and block a flow of current in the second current-conductive branch 14. More particularly, the second switching controller 38 includes a gate drive connected to the cathode 36 and a gate 40 of the gas tube switch which allows the gate drive to control a voltage across the cathode 36 and gate 40 for controlling the turn-on and turn-off of the gas tube switch.

The energy absorption branch 16 includes an energy absorption device in the form of a metal-oxide surge arrester 42.

Operation of the DC circuit breaker 10 to interrupt current in the DC electrical network 22 is described as follows.

In the normal mode of operation of the DC circuit breaker 10, the first and mechanical switching elements 24,26 are closed to permit current to flow through the first current-conductive branch 12 while the second switching element 32 is opened to block current from flowing through the second current-conductive branch 14, so that a DC load current flows through the first current-conductive branch 12. Meanwhile little to no current flows through the energy absorption branch 16.

Figure 2:
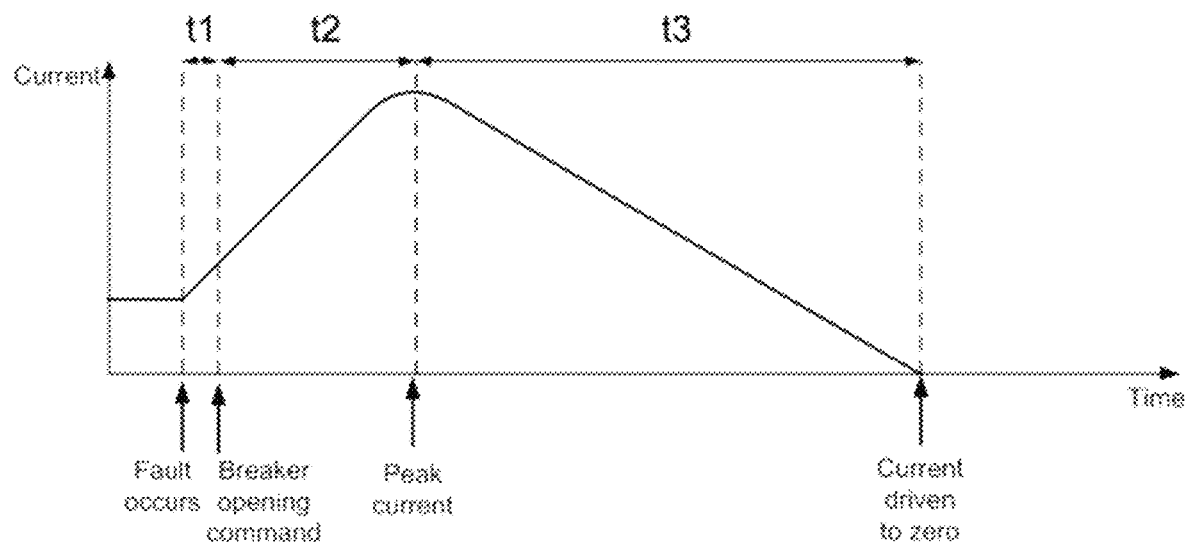
FIG. 2 illustrates a current interruption operation of the DC circuit breaker of FIG. 1.

A fault or other abnormal operating condition in the DC electrical network 22 may lead to high fault current flowing through the DC electrical network 22. In response to an event of high fault current in the DC electrical network 22, the DC circuit breaker 10 is operated to interrupt the high fault current as shown in FIG. 2 which illustrates the profile of current through the DC circuit breaker 10 during a fault clearing event.

At the instant of fault inception, the current through the DC circuit breaker 10 starts rising rapidly at a rate given by V/L, where V is the voltage of the DC electrical network 22 and L is the total inductance of the DC electrical network power supply and any added inductance in the DC circuit breaker 10 itself. After a time t1 following the occurrence of the fault, the DC circuit breaker 10 is commanded to open, which results in the turn-off of the IGBT T1 in the first current-conductive branch 12 to provide a commutating electromotive force, typically a few kV, for diverting the fault current into the second current-conductive branch 14. This is shortly followed by the turn-on of the gas tube switch to permit the fault current to flow in the second current-conductive branch 14.

Thereafter, the fault current continues to rise until it reaches a peak current at a further time t2, which is when the mechanical switching element 26 is fully open and the gas tube switch is turned off to divert the fault current into the energy absorption branch 16. At the end of the fault current interruption process (as indicated by the period t3 in FIG. 2), the surge arrester of the energy absorption branch 16 provides the back-electromotive force to force the fault current down to zero (or a negligible amount close to zero).

The gas tube switch is suitable for use in the second current-conductive branch 14 to temporarily carry the fault current until the mechanical switching element 26 is fully opened to then allow the fault current to be diverted to the energy absorption branch 16. This is mainly due to its compactness and its inherent ability to provide a single high-voltage switch with a voltage rating of hundreds of kV, which allows the second switching element 32 to be cheaper and more compact when compared to a switching element based on a plurality of semiconductor switches with an equivalent combined voltage rating.

Figure 3:
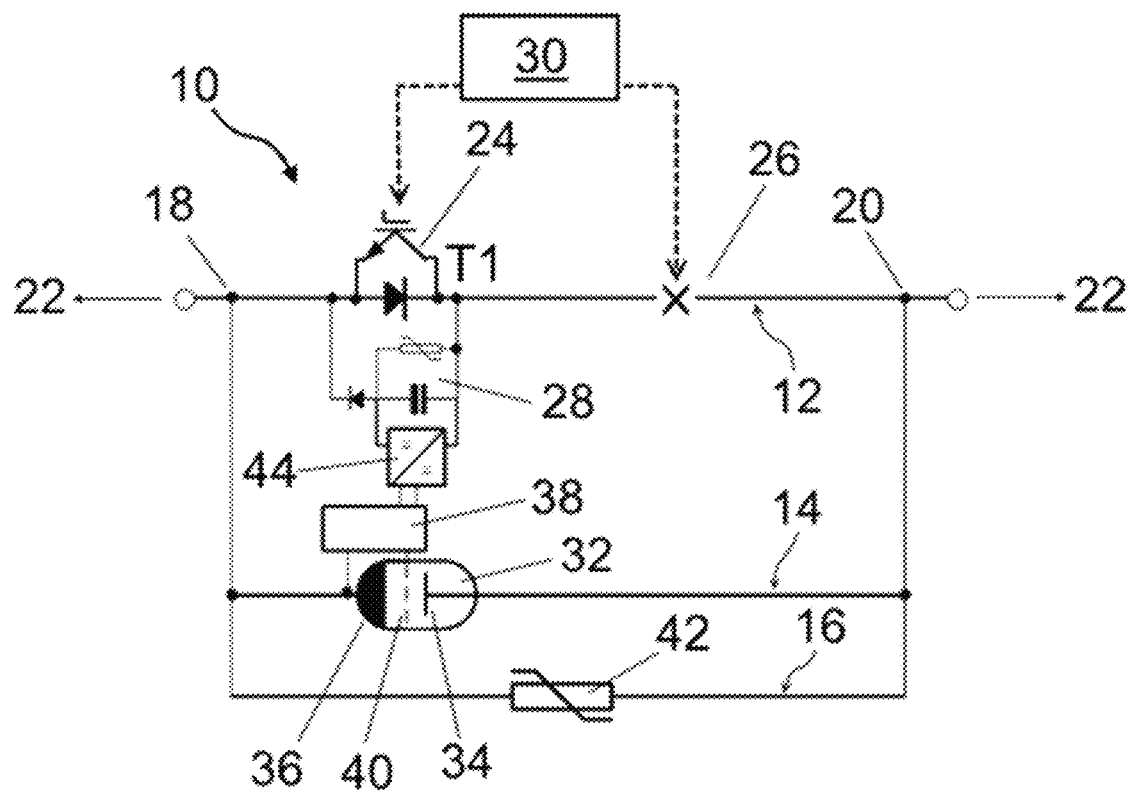
FIG. 3 shows schematically a galvanically isolated electrical connection of the DC circuit breaker of FIG. 1.

In order to supply power to the gas tube switch, the capacitor of the snubber circuit 28 is electrically coupled to the gas tube switch so that the capacitor is configured as a power source for enabling the operation of the gas tube switch. FIG. 3 shows an exemplary coupling of the capacitor of the snubber circuit 28 to the gate drive of the second switching controller 38. A galvanically isolated electrical connection is formed between the capacitor and the gate drive, where the galvanically isolated electrical connection includes an isolating DC-DC converter 44 configured to transmit power from the capacitor to the gate drive. This allows the capacitor to be configured as a power source to supply power to the gate drive for enabling the switching of the gas tube switch.

During the fault current interruption process, the turn-off of the IGBT T1 of the first switching element 24 results in the fault current being directed through the capacitor of the snubber circuit 28. This results in a rapid charge-up of the capacitor until a protective level of the parallel-connected surge arrester is reached, which causes the voltage across the capacitor to be clamped. The voltage across the capacitor can be used as a source of energy for the gate drive of the gas tube switch to carry out the turn-on and turn-off of the gas tube switch in the fault current interruption process.

In the switching apparatus, an emitter terminal of the IGBT T1 and the cathode 36 of the gas tube switch are both connected to a common node, which is the first DC terminal 18 shown in FIGS. 1 and 3. This allows the capacitor of the snubber circuit 28 and the gate drive to be at the same, or substantially the same, electrical potential which allows for a reduction in the voltage isolation requirements of the capacitor.

Figure 4:
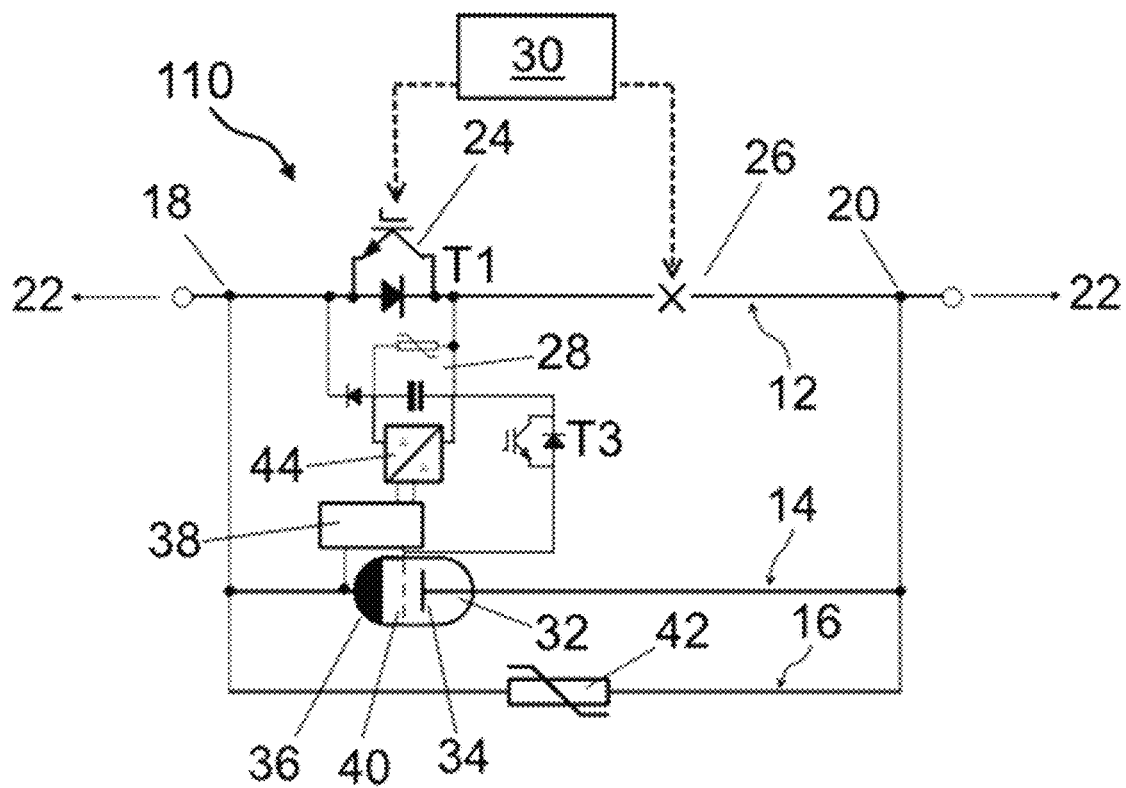
FIG. 4 shows schematically a DC circuit breaker according to a second embodiment of the invention.

A DC circuit breaker according to a second embodiment of the invention is shown in FIG. 4 and is designated generally by the reference numeral 110. The DC circuit breaker 110 of FIG. 4 is similar in structure and operation to the DC circuit breaker 10 of FIGS. 1 and 3, and like features share the same reference numerals.

The DC circuit breaker 110 of FIG. 4 differs from the DC circuit breaker 10 of FIGS. 1 and 3 in that, in addition to the galvanically isolated electrical connection, a direct electrical connection is formed between the capacitor of the snubber circuit 28 and the gate 40 of the gas tube switch. The direct electrical connection includes an additional IGBT T3 configured to directly connect the positive terminal of the capacitor to the gate 40 of the gas tube switch.

The additional IGBT T3 stays in the off state during the normal operation of the DC circuit breaker 110. During the fault current interruption process, the turn-on of the gas tube switch is carried out by turning on the additional IGBT T3 so as to enable the capacitor to directly apply a voltage to the gate 40, while the turn-off of the gas tube switch is carried out in the manner described above using the isolating DC-DC converter 44 to transmit power from the capacitor to the gate drive.

Using the additional IGBT T3 to enable the turn-on of the gas tube switch improves the responsiveness of the DC circuit breaker 110 to the occurrence of a fault. This is because the isolating DC-DC converter 44 may take a finite time to start up. Since the turn-off of the gas tube switch typically occurs a few milliseconds after the turn-on of the gas tube switch, sufficient time is available for the isolating DC-DC converter 44 to start up.

Figure 5:
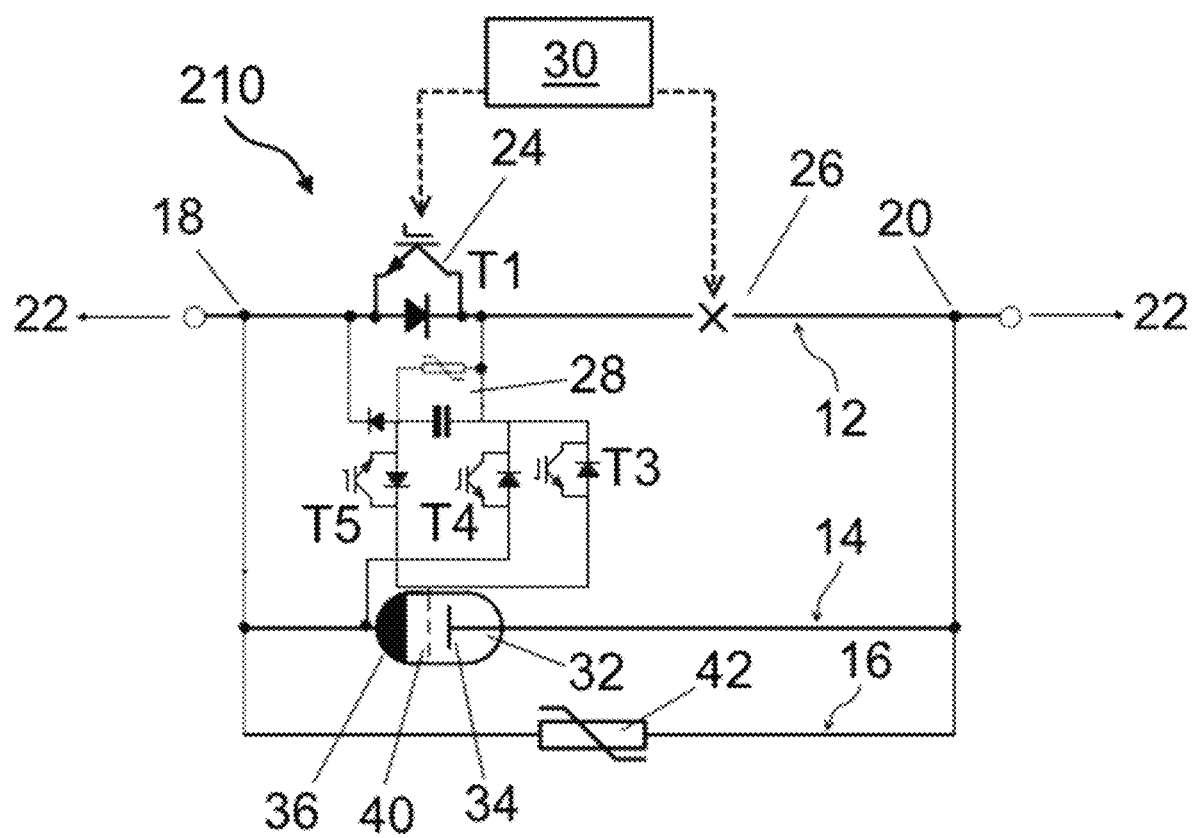
FIG. 5 shows schematically a DC circuit breaker according to a third embodiment of the invention.

A DC circuit breaker according to a third embodiment of the invention is shown in FIG. 5 and is designated generally by the reference numeral 210. The DC circuit breaker 210 of FIG. 5 is similar in structure and operation to the DC circuit breaker 110 of FIG. 4, and like features share the same reference numerals.

The DC circuit breaker 210 of FIG. 5 differs from the DC circuit breaker 110 of FIG. 4 in that the DC circuit breaker 210 of FIG. 5 omits the galvanically isolating electrical connection and the gate drive, and the capacitor is connected to the cathode 36 and gate 40 of the gas tube switch via a further direct electrical connection. More particularly, the positive terminal of the capacitor is connected to the cathode 36 of the gas tube switch via another additional IGBT T4, and the negative terminal of the capacitor is connected to the gate 40 of the gas tube switch via a further additional IGBT T5.

The omission of the isolating DC-DC converter 44 from the DC circuit breaker results in a simpler and more compact arrangement of the DC circuit breaker.

The operation of the additional IGBTs T3, T4, T5 is described as follows with reference to FIGS. 6 and 7.

Figure 6:
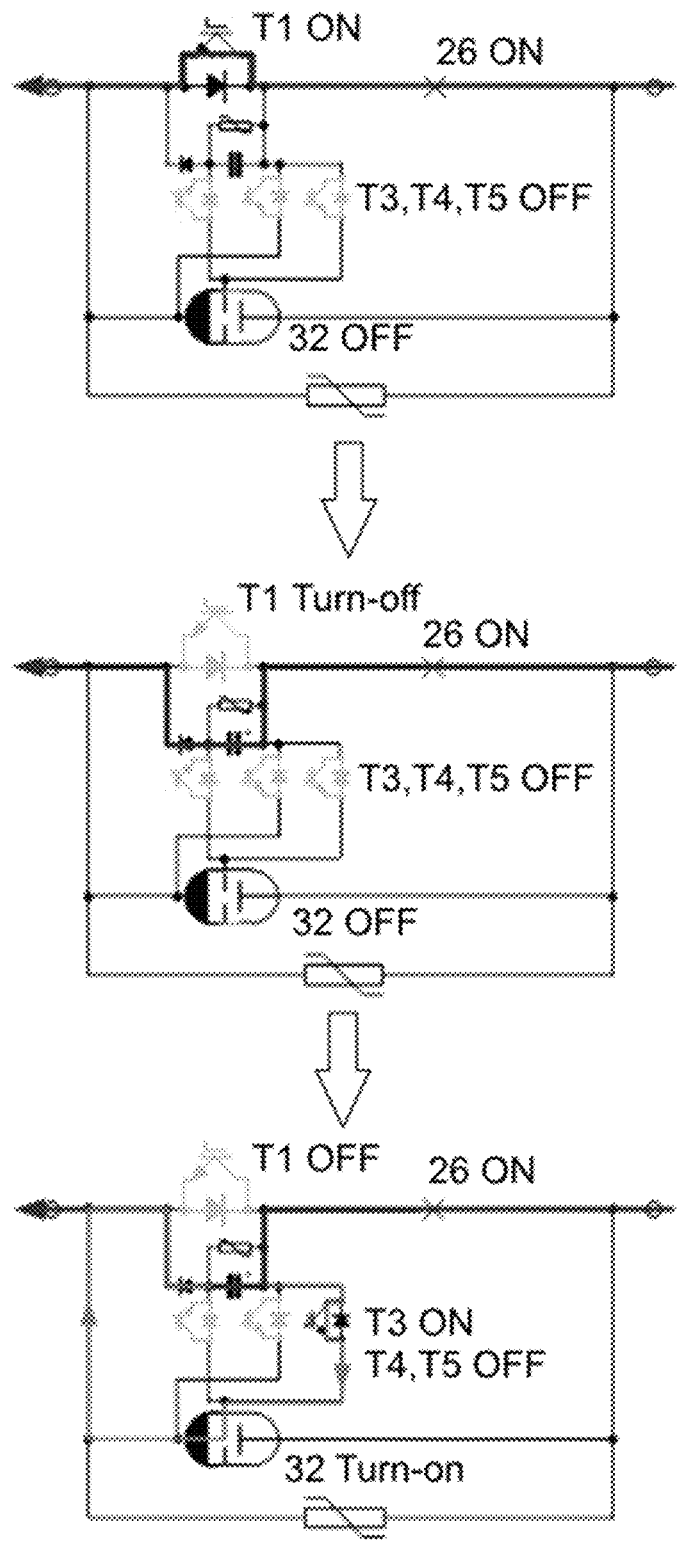
FIGS. 6 and 7 illustrate a current interruption operation of the DC circuit breaker of FIG. 5.
Figure 7:
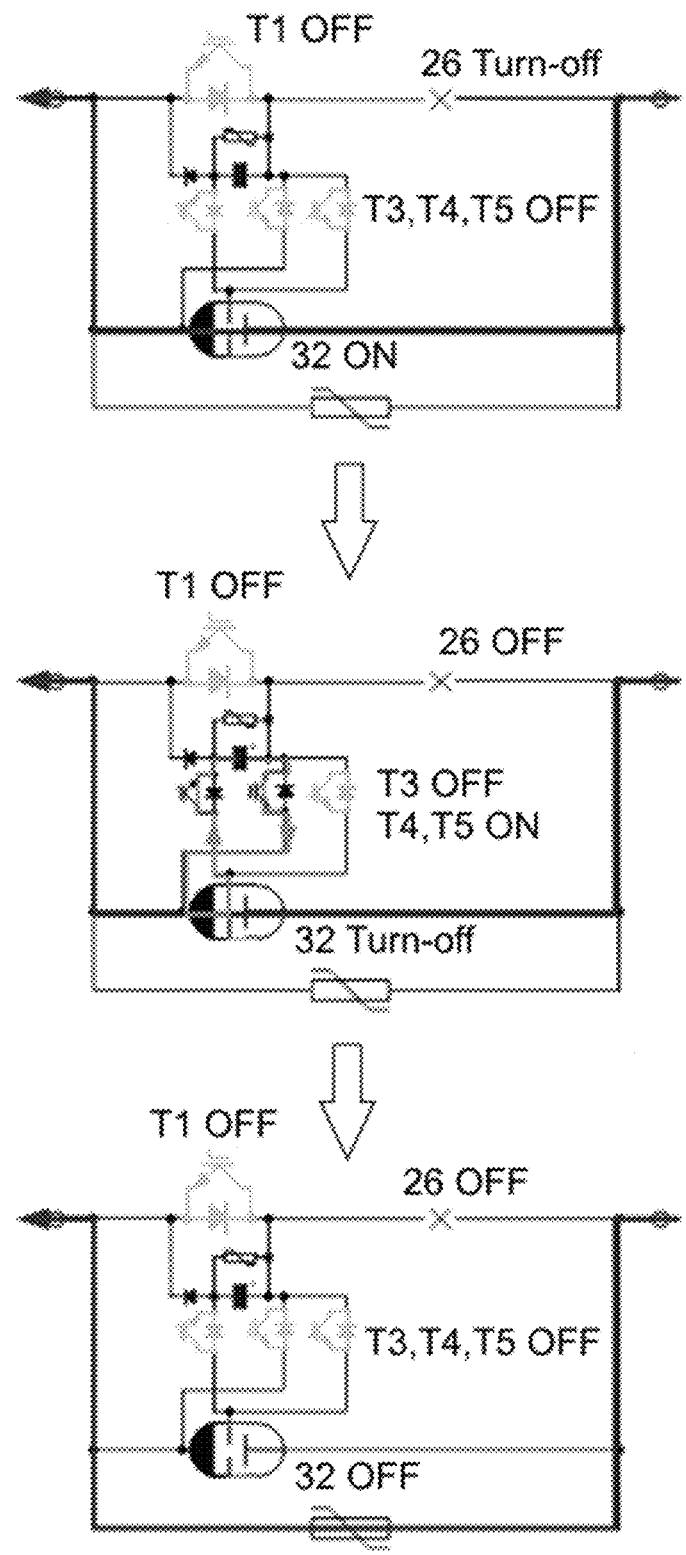

Referring to FIG. 6, during normal operation of the DC circuit breaker 210, all three additional IGBTs T3, T4, T5 remain in the off-state. During the fault current interruption process, the additional IGBT T3 is briefly turned on (e.g. for about 1 μs) and then turned off again. This connects the positive terminal of the capacitor to the gate 40 of the gas tube switch such that a small pulse of current flows out of the positive terminal of the capacitor into the gate 40 of the gas tube switch and back to the negative terminal of the capacitor via the diode of the snubber circuit 28. As long as the transient current in the gate 40 is less than the fault current, the diode of the snubber circuit 28 remains forward biased and the conducting loop is complete. This enables the gas tube switch to latch into its conducting state so that current can be commutated from the first current-conductive branch 12 to the second current-conductive branch 14, driven by the voltage on the capacitor of the snubber circuit 28.

When the ultra-fast mechanical switch is fully open, the gas tube switch is then turned off by turning on the additional IGBTs T4,T5, which has the effect of connecting the negative terminal of the capacitor to the gate 40 of the gas tube switch and connecting the positive terminal of the capacitor to the cathode 36 of the gas tube switch. This allows the capacitor to act as a current sink to divert the fault current out of the gate 40 until the gas tube switch turns off. Thereafter, the fault current commutates from the second current-conductive branch 14 into the energy absorption branch 16.

The above embodiments are applicable to a unidirectional DC circuit breaker for clearing a fault current in one direction, which in FIGS. 1 and 3 to 7 is from right to left.

The invention is also applicable to a bidirectional DC circuit breaker for clearing a fault current in both directions, as follows.

Figure 8:
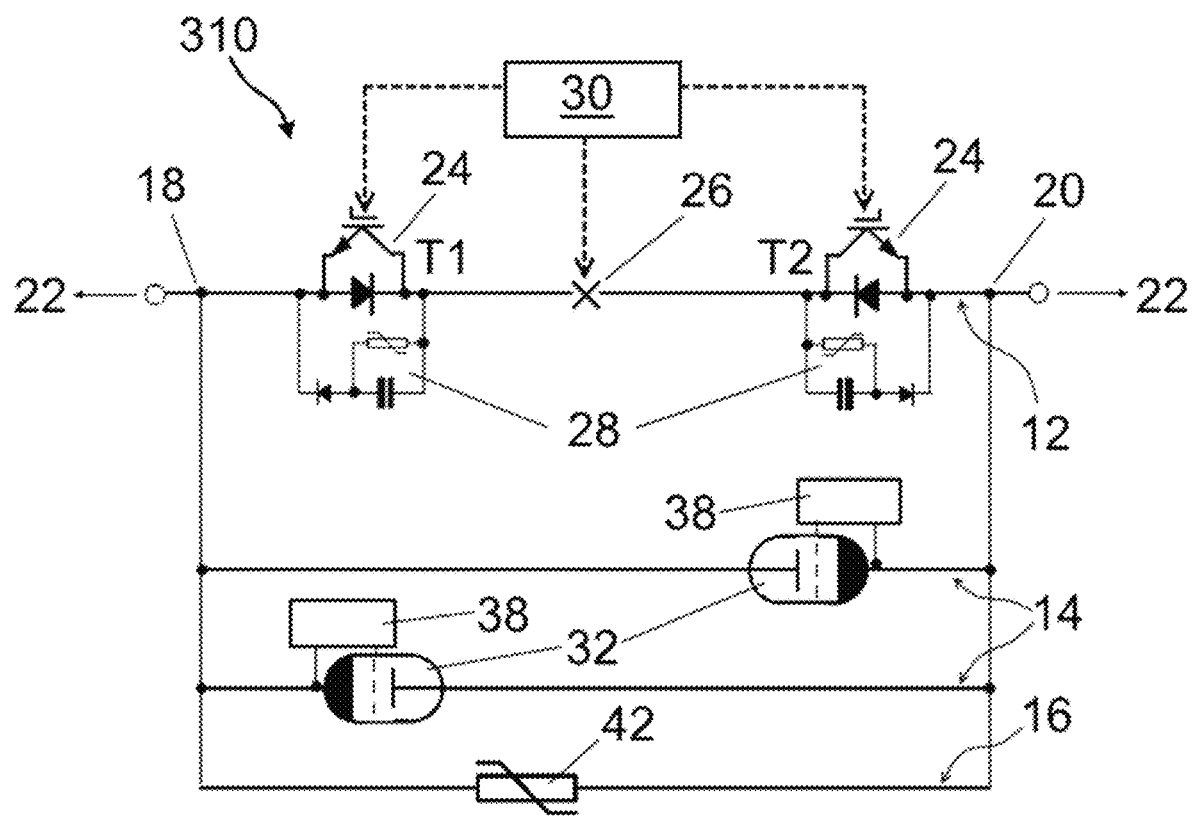
FIG. 8 shows schematically a DC circuit breaker according to a fourth embodiment of the invention.

A DC circuit breaker according to a fourth embodiment of the invention is shown in FIG. 8 and is designated generally by the reference numeral 310. The DC circuit breaker 310 of FIG. 8 is similar in structure and operation to the DC circuit breaker 10 of FIGS. 1 and 3, and like features share the same reference numerals.

The DC circuit breaker 310 of FIG. 8 differs from the DC circuit breaker 10 of FIGS. 1 and 3 in that, in the DC circuit breaker 310 of FIG. 8, the first switching element 24 includes a pair of IGBTs T1,T2 connected in series with respective ends of the mechanical switching element 26, and the second switching element 32 includes a pair of gas tube switches connected in anti-parallel. In the first current-conductive branch 12, the IGBTs T1,T2 are connected in inverse series, and each IGBT T1,T2 is connected in parallel with a respective snubber circuit 28. In the second current-conductive branch 14, each gas tube switch is connected to a respective gate drive, and the gate drives are connected to respective capacitors of the snubber circuits 28.

In this way one IGBT-gas tube switch pair T1,32 is configured to selectively permit and block a flow of current in the first and second current-conductive branches 12,14 in one direction between the first and second DC terminals 18,20, and the other IGBT-gas tube switch pair T2,32 is configured to selectively permit and block a flow of current in the first and second current-conductive branches 12,14 in the other direction between the first and second DC terminals 18,20.

The configuration of the DC circuit breaker 310 of FIG. 8 enables the fault current interruption process to be carried out in respect of fault currents in both directions between the first and second DC terminals 18,20. More specifically, the fault current interruption process for a fault current flowing from the first DC terminal 18 to the second DC terminal 20 is carried out by way of the switching of one of the IGBT-gas tube switch pairs T1,32, and the fault current interruption process for a fault current flowing from the second DC terminal 20 to the first DC terminal 18 is carried out by way of the switching of the other of the IGBT-gas tube switch pairs T2,32.

It is envisaged that, in other embodiments of the invention, the DC circuit breaker 10,110,210,310 may include a plurality of switching apparatus, such as a plurality of switching apparatus connected in series, in order to increase the interruption capabilities of the DC circuit breaker 10,110,210,310.

During the normal operation of the DC circuit breaker 10,110,210,310, the gas tube switch may require a small amount of auxiliary power to continuously power one or more auxiliary systems of the gas tube switch. For the purposes of this specification, the purpose of an auxiliary system of the gas tube switch is to carry out an auxiliary operation of the gas tube switch, which is not the turn-on or turn-off of the gas tube switch. The auxiliary operations may include:

- operating at least one monitoring device (e.g. a current sensor, a voltage sensor, a gas pressure sensor, a temperature sensor) to monitor an operating state (e.g. current, voltage, internal gas pressure, temperature) of the or each gas tube switch;
- operating the or each "keep-alive" grid electrode to control an or a respective electric field in the or each gas tube switch so as to maintain a or a respective conductive plasma in the or each gas tube switch;
- operating at least one gas pressure controller, such as a pumping system, to control an internal gas pressure in the or each gas tube switch.

To provide the required auxiliary power, the or each capacitor of the snubber circuit(s) 28 in the foregoing embodiments may be configured as a power source compatible with the power requirements of one or more auxiliary operations of the or each gas tube switch. In such embodiments, the or each capacitor of the snubber circuit(s) 28 may be connected, via a galvanically isolated electrical connection and/or a direct electrical connection, to one or more auxiliary systems of the or each gas tube switch.

The auxiliary power is provided to the auxiliary systems of the gas tube switch(es) by turning off the IGBT(s) T1,T2 of the first switching element 24 periodically or intermittently to briefly divert the DC load current into the capacitor(s) to top up the energy stored in the capacitor(s), before turning on the IGBT(s) T1,T2 again to resume the primary function of conducting the DC load current during the normal operation of the DC circuit breaker 10,110,210,310. This permits the capacitor(s) to provide a continuous supply of auxiliary power for enabling the auxiliary operations of the gas tube switch. Since the capacitor(s) can be configured to remain charged for a long time and the power consumption requirements of the auxiliary systems can be designed to be very low, e.g. a few Watts, each IGBT T1,T2 of the first switching element 24 can remain in its turned-on state for the majority of the normal operation of the DC circuit breaker.

The configuration of the switching apparatus of the invention therefore not only provides a power supply mechanism by which the energy for powering the gas tube switch can be derived from a DC load or fault current flowing in the first current-conductive branch 12, thus obviating the need for a stand-alone power source for the gas tube switch, but also permits the supply of energy from the DC load or fault current in the first current-conductive branch 12 to the gas tube switch of the second switching element 32, via the storage of energy in the capacitor of the snubber circuit 28, even when the DC circuit breaker 10,110,210,310 is designed to operate at high voltage levels which may be incompatible with the power requirements of the operation of the gas tube switch.

It will be appreciated that the DC circuit breakers 10,110, 210,310 in the embodiments shown are selected to help illustrate the working of the invention, and is not intended to be limiting on the scope of applications to which the switching apparatus can be applied. The switching apparatus may be applicable to other types of electrical assemblies with switching capabilities, particularly other types of electrical assemblies requiring a commutation of a current between parallel-connected current-conductive branches.

It will also be appreciated that the type and number of components in each branch 12,14,16 may vary depending on the design requirements of the DC circuit breaker 10,100, 210,310. It is envisaged that, in other embodiments of the invention, the first switching element 24 may include a plurality of switching devices (e.g. series-connected and/or parallel-connected switching devices), the mechanical switching element 26 may include a plurality of mechanical switches (e.g. series-connected and/or parallel-connected mechanical switches), the second switching element 32 may include a plurality of gas tube switches (e.g. series-connected and/or parallel-connected gas tube switches), and/or the energy absorption branch 16 may include a plurality of energy absorption devices (e.g. series-connected and/or parallel-connected energy absorption devices). It is also envisaged that, in still other embodiments of the invention, each IGBT T1,T2,T3,T4,T5 may be replaced by a different type of semiconductor switching device, and/or the mechanical switching element 26 may additionally or alternatively include a different type of mechanical switch.

The invention claimed is:

1. A switching apparatus comprising:
 a first current-conductive branch including a first switching element, the first switching element configured to be switchable to selectively permit and block a flow of current in the first current-conductive branch;
 a second current-conductive branch including a second switching element, the second switching element configured to be switchable to selectively permit and block a flow of current in the second current-conductive branch; and
 first and second terminals for connection, in use, to an electrical network, wherein the first and second current-conductive branches extend between the first and second terminals,
 wherein the first current-conductive branch further includes an energy storage element electrically coupled to the second switching element so that the energy storage element is configured as a power source for enabling the operation of the second switching element, and the first switching element is configured to be switchable to selectively direct a current flowing in the first current-conductive branch to flow through the energy storage element so as to store energy in the energy storage element.

2. The switching apparatus according to claim 1 wherein the operation of the second switching element includes at least one of:
 a turn-on of the second switching element; and
 a turn-off of the second switching element.

3. The switching apparatus according to claim 1 wherein the second switching element includes at least one gas tube switch.

4. The switching apparatus according to claim 3 wherein the operation of the second switching element includes at least one of:
 operating at least one monitoring device to monitor an operating state of the or each gas tube switch, wherein the switching apparatus includes the or each monitoring device;
 operating an or a respective electrode to control an or a respective electric field in the or each gas tube switch so as to maintain a or a respective conductive plasma in the or each gas tube switch, wherein the or each gas tube switch includes the or the respective electrode; and
 operating at least one gas pressure controller to control an internal gas pressure in the or each gas tube switch, wherein the switching apparatus includes the or each gas pressure controller.

5. The switching apparatus according to claim 1 further including a switching controller configured to selectively control the switching of the first switching element to periodically or intermittently direct a current flowing in the first current-conductive branch to flow through the energy storage element so as to maintain a non-zero level of energy stored in the energy storage element.

6. The switching apparatus according to claim 1 wherein the energy storage element is electrically coupled to the second switching element to form a galvanically isolated electrical connection between the energy storage element and the second switching element, and the galvanically isolated electrical connection is arranged to configure the energy storage element as a power source for enabling the operation of the second switching element.

7. The switching apparatus according to claim 1 wherein the energy storage element is electrically coupled to the second switching element to form a direct electrical connection between the energy storage element and the second switching element, and the direct electrical connection is arranged to configure the energy storage element as a power source to enable the operation of the second switching element.

8. The switching apparatus according to claim 7 wherein the direct electrical connection includes at least one third switching element.

9. The switching apparatus according to claim 7, wherein the energy storage element is electrically coupled to the second switching element to form a galvanically isolated electrical connection between the energy storage element and the second switching element, wherein the galvanically isolated electrical connection is arranged to configure the energy storage element as a power source for enabling one of: a turn-on of the second switching element; and a turn-off of the second switching element, and wherein the direct electrical connection is arranged to configure the energy storage element as a power source for enabling the other of: a turn-on of the second switching element; and a turn-off of the second switching element.

10. The switching apparatus according to claim 1 wherein the first current-conductive branch includes a non-linear resistive element configured to clamp a voltage across the energy storage element when a protective level of the non-linear resistive element is reached.

11. The switching apparatus according to claim 1 wherein the energy storage element is configured as a snubber component for the first switching element.

12. The switching apparatus according to claim 1 wherein an emitter terminal of the first switching element and a cathode terminal of the second switching element are connected to a common node.

13. The switching apparatus according to claim 1 wherein each of the first and second switching elements is configured as a unidirectional or bidirectional switching element.

14. The electrical assembly according to claim 13 wherein the electrical assembly includes a plurality of switching apparatus connected in series.

15. An electrical assembly comprising at least one switching apparatus according to claim 1.

16. The electrical assembly according to claim 15 wherein the electrical assembly is a circuit interruption device.

* * * * *